United States Patent [19]
Osawa

[11] Patent Number: 5,890,790
[45] Date of Patent: Apr. 6, 1999

[54] ILLUMINATOR WITH LIGHT-EMITTING SURFACE

[75] Inventor: Hideharu Osawa, Kyoto, Japan

[73] Assignee: Rohm Co., Ltd., Kyoto, Japan

[21] Appl. No.: 803,284

[22] Filed: Feb. 20, 1997

[30] Foreign Application Priority Data

Feb. 27, 1996 [JP] Japan ..................................... 8-039529

[51] Int. Cl.⁶ .............................. G01D 11/28; F21V 7/04; H01R 33/00
[52] U.S. Cl. ............................. 362/27; 362/800; 313/512
[58] Field of Search ..................................... 313/512, 500; 362/800, 27; 349/45, 49, 61, 62; 315/169.3

[56] References Cited

U.S. PATENT DOCUMENTS 5,375,043 12/1994 Tokunaga ................................. 362/800
5,564,819 10/1996 Yamaguchi .............................. 313/512

*Primary Examiner*—Nimeshkumar D. Patel
*Attorney, Agent, or Firm*—Majestic, Parsons, Siebert & Hsue, P.C.

[57] ABSTRACT

An illuminator has light sources near the edge of a transparent or translucent light-conducting plate. Each light source is formed with two or more LED chips for emitting light of different colors such as yellowish green, red and blue. The LED chips for each light source are placed close to one another and aligned in the direction of thickness of the light-conducting plate.

12 Claims, 4 Drawing Sheets

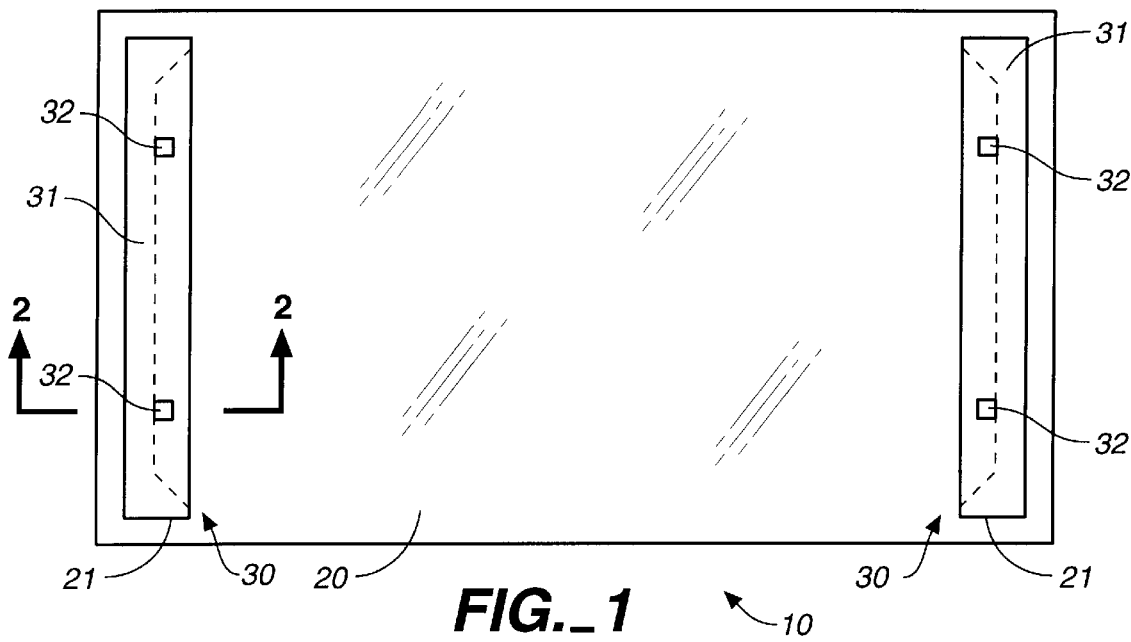
FIG._1
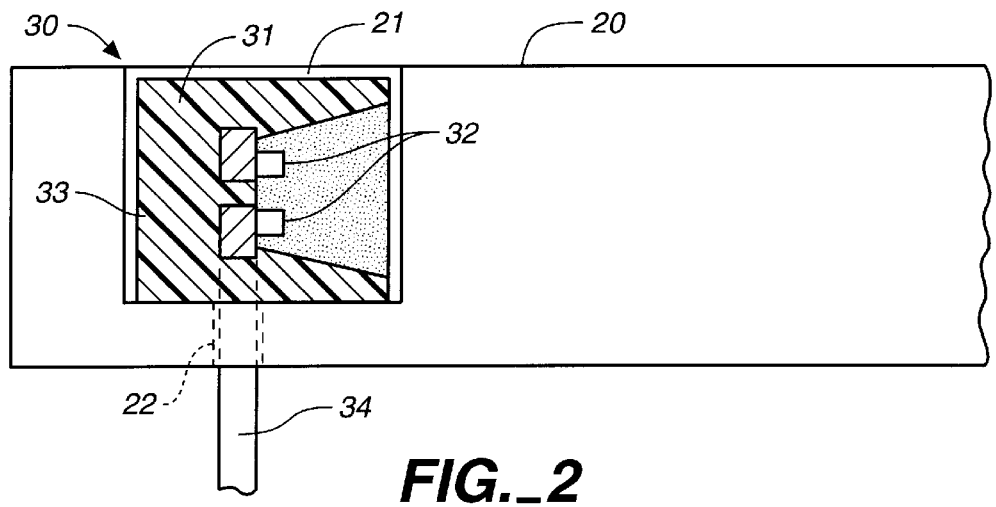
FIG._2
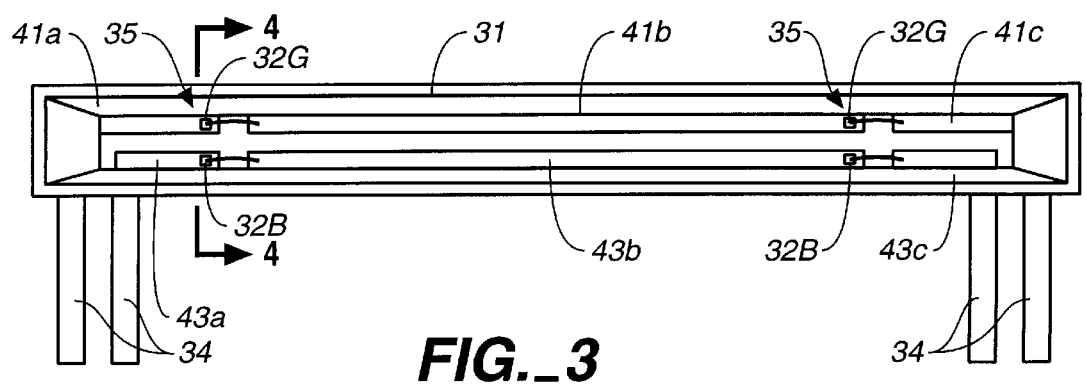
FIG._3

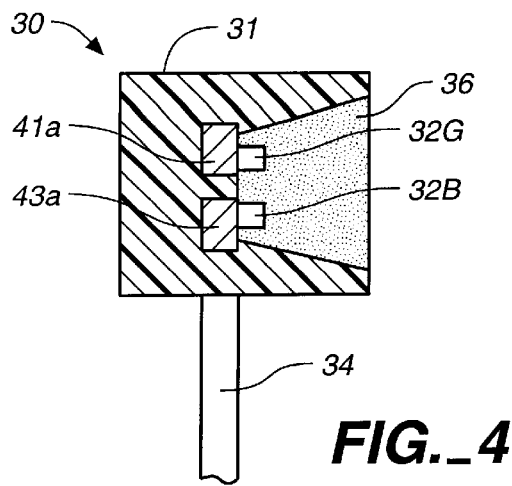
FIG._4
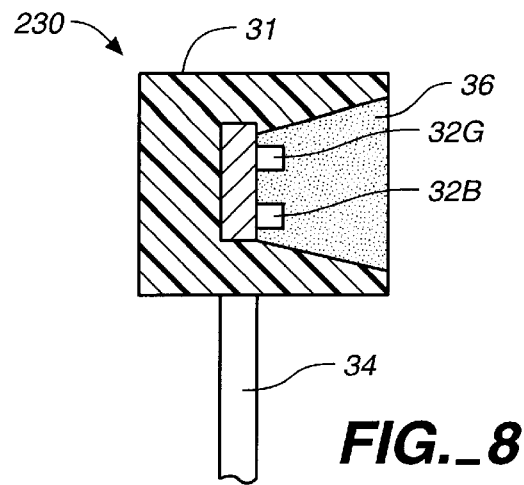
FIG._8
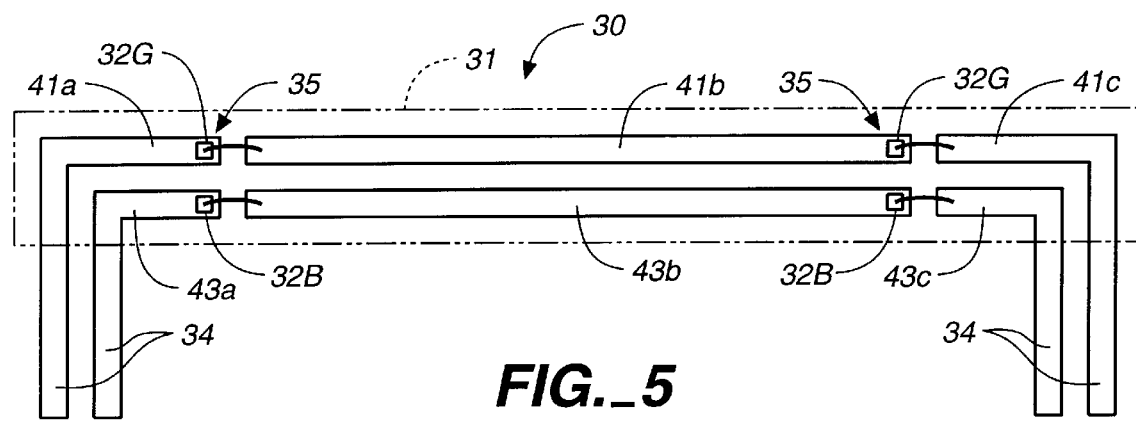
FIG._5
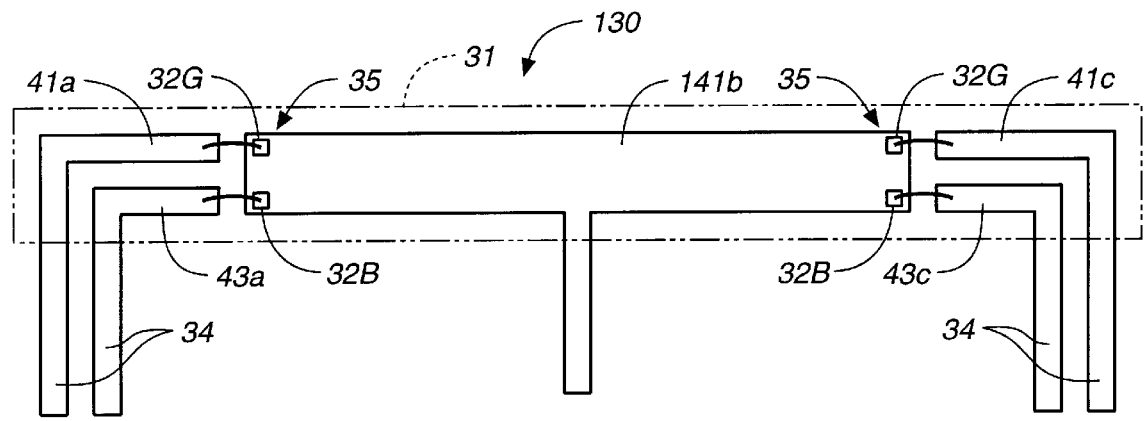
FIG._6

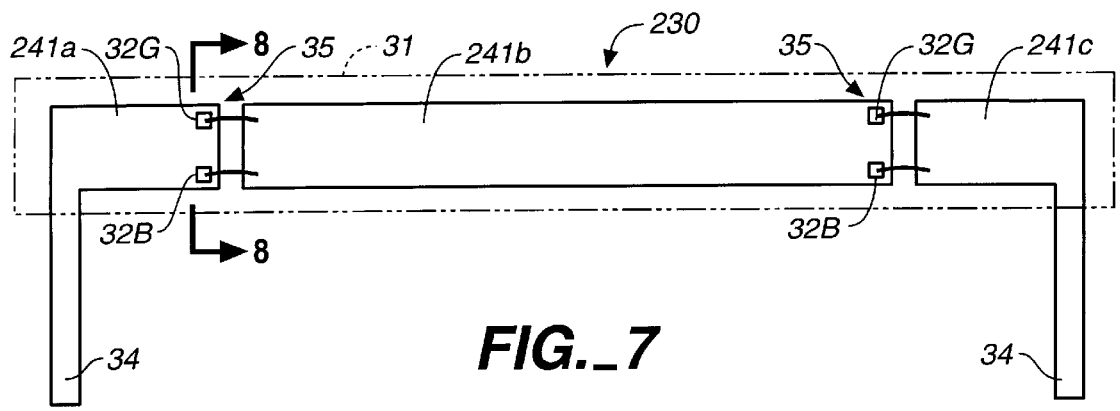
FIG._7
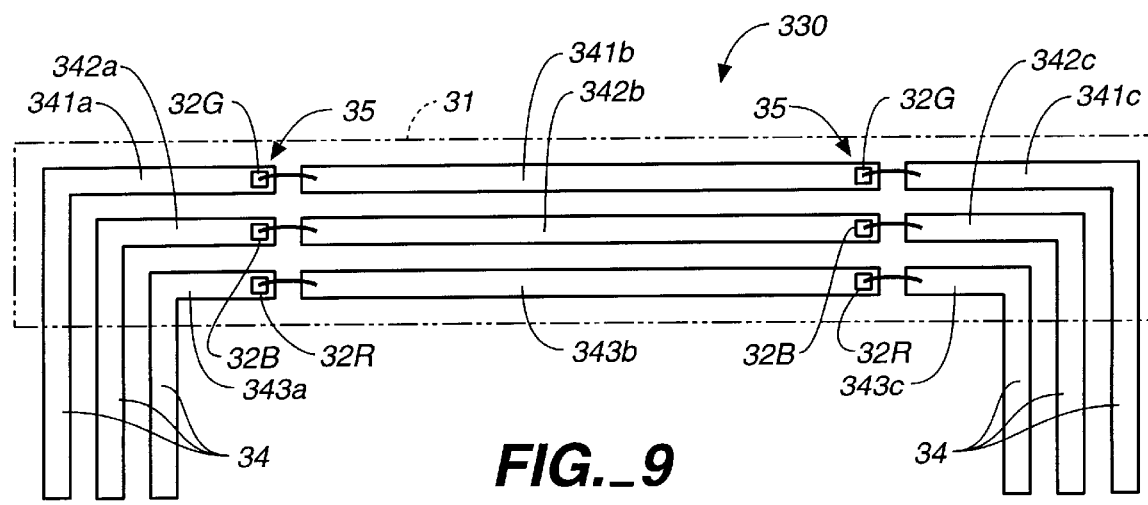
FIG._9
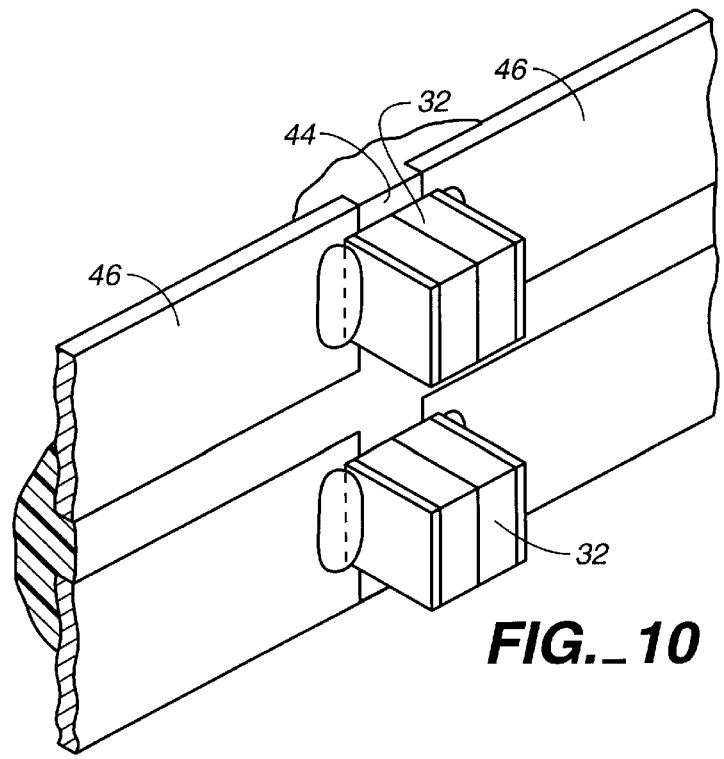
FIG._10

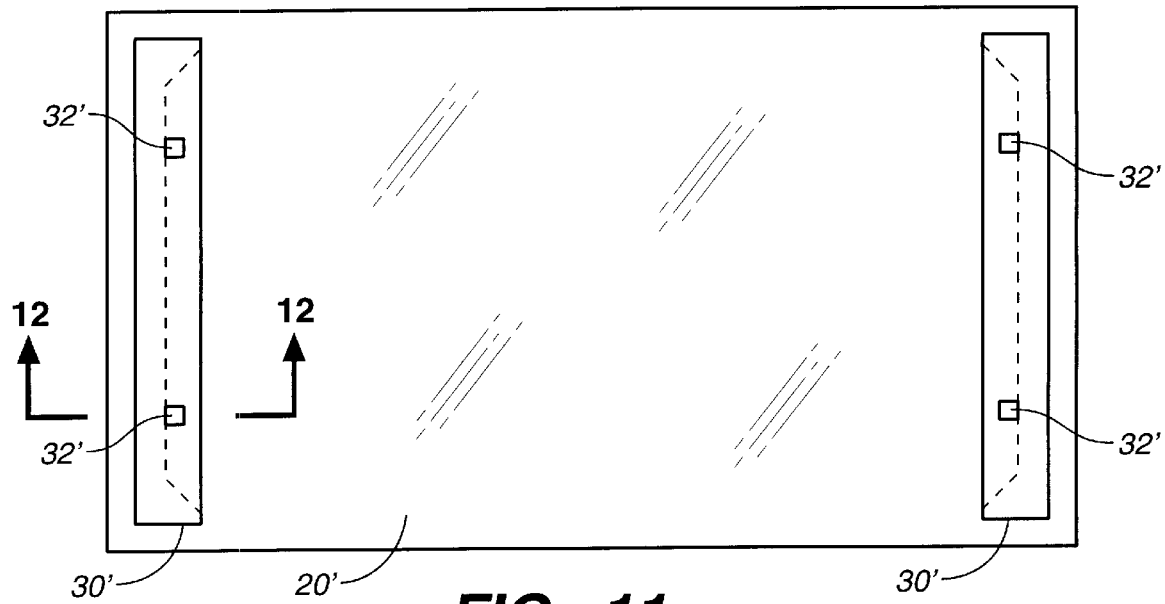
FIG._11
(PRIOR ART)
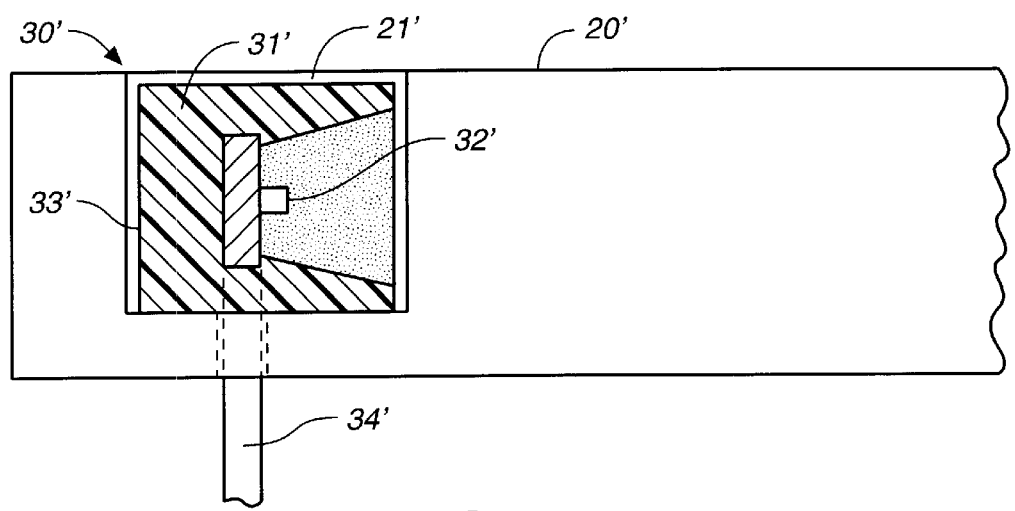
FIG._12
(PRIOR ART)

ILLUMINATOR WITH LIGHT-EMITTING SURFACE

BACKGROUND OF THE INVENTION

This invention relates to an illuminator such as a liquid crystal display device of the so-called back lighting type which does not emit light itself but has a light source behind it such that its visibility can be improved.

An example of such an illuminator was disclosed in Japanese Utility Model Publication Jikko 4-14943 and, as shown in FIGS. 11 and 12, comprises a light-conducting transparent or translucent plate 20' having a uniform thickness and concave indentations 21' near its edges containing light source units 30'. As shown in FIG. 12, the light source unit 30' forms a light-emitting part 33' by placing a LED chip 32' near the bottom of a box-shaped reflector case 31' with an open front, filling the interior of the case with a transparent resin material, and extending a terminal lead line 34' from this light-emitting part 33'. Light emitted from the LED chip 32' is reflected by the inner surfaces of the reflective case 31' and enters the interior of the light-conducting plate 20', spreading throughout the light-conducting plate 20' by repeatedly undergoing total reflections at its top and bottom boundary surfaces and eventually being emitted outward from the surface. As a result, although the light source units 30' are placed at edge portions of the light-conducting plate 20', the entire surface area of the light-conducting plate 20' seems to be shining.

Light emitted from a LED chip is monochromatic. LED chips adapted to emit red, green and blue light are now available. Although white light is ideal for back lighting, green LED chips were usually used as a light source for an illuminator of the type described above if LED chips were to be used as the light source at all. Although a plurality of LED chips are generally placed separate from one another in order to illuminate the entire surface of a light-conducting plate uniformly, since LED chips of the same color are usually used, it was not possible to change the color of emitted light from an illuminator as a whole.

SUMMARY OF THE INVENTION

It is therefore an object of this invention to provide an illuminator with a light-emitting surface using LED chips as its light source with which the user can select various colors of emitted light and cause the color of the emitted light to change.

An illuminator embodying this invention, with which the above and other objects can be accomplished, may be characterized as comprising a transparent or translucent light-conducting plate and a light source which is placed near the edge of this plate and includes a plurality of LED chips disposed mutually near for emitting light of different colors. In short, since LED chips emitting different colors of light are placed near one another to together serve as a light source, different colors of light can be emitted by mixing the colors of these LED chips.

According to a preferred embodiment of this invention, such LED chips forming a light source are disposed so as to mutually overlap in the direction of the thickness of the light-conducting plate. With LED chips thus arranged, light beams with different colors emitted from different LED chips appear to mutually overlap in the direction of the thickness of the plate even in areas near the light source. Thus, the light-conducting plate appears to be a uniform light emitter of a mixed color, without having any of the color components to appear accentuated.

According to a further preferred embodiment of this invention, each of the LED chips forming a light source can be independently controlled for each color such that the mixing ratio of colors of emitted light, and hence the resulting color, can be changed by varying the driving currents or voltages of the LED chips.

The light source may be formed with three LED chips for emitting light of red, blue and green. Since these are the primary colors, any desired color, including white, can be created by properly mixing them. Alternatively, a LED chip emitting yellowish green light and another LED chip emitting blue light may be coupled together to form the light source. Since yellowish green may be considered a mixture of green and red, nearly white light can be obtained by properly mixing these two colors of light. This choice is preferred because only two LED chips are required to form the light source. Thus, it not only contributes to the reduction in the production cost but also makes it easier to arrange the LED chips in the direction of the thickness of the light-conducting plate with a fixed thickness.

Other characteristics and advantages of this invention will become apparent with the description given below with reference to the drawings.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a plan view of an illuminator with a light-emitting surface embodying this invention;

FIG. 2 is a sectional view of the illuminator of FIG. 1 taken along line 2—2;

FIG. 3 is a front view of a light source unit adapted to be incorporated in the illuminator;

FIG. 4 is a sectional view of the light source unit of FIG. 3 taken along line 4—4;

FIG. 5 is a transparent front view of the light source unit of FIG. 3;

FIG. 6 is a front view of another light source unit adapted to be incorporated in the illuminator;

FIG. 7 is a front view of still another light source unit adapted to be incorporated in the illuminator;

FIG. 8 is a sectional view of the light source unit of FIG. 7 taken along line 8—8;

FIG. 9 is a front view of still another light source unit adapted to be incorporated in the illuminator;

FIG. 10 is a sketch for showing another way of connecting the LED chips of a light source unit to the terminal plate;

FIG. 11 is a plan view of a prior art illuminator with a light-emitting surface; and FIG. 12 is a sectional view of the illuminator of FIG. 11 taken along line 12—12.

Throughout herein, components which are substantially equal one another are indicated by the same numerals and may not be repetitively explained although belonging to different embodiments.

DETAILED DESCRIPTION OF THE INVENTION

FIGS. 1 and 2 show an illuminator 10 embodying this invention, comprising a light-conducting rectangular plate 20 of a specified uniform thickness, made of a transparent or translucent resin, and light source units 30 each set inside an indentation 21 formed along a shorter side edge of the light-conducting plate 20. As shown more clearly in FIG. 2, each light source unit 30 has LED chips 32 near the bottom of a box-shaped reflector case 31 made of a resin material with an open front to form a light-emitting part 33. Terminal lead lines 34 extend from the bottom surface of the light-emitting part 33. The indentation 21 is shaped so as to admit the light-emitting part 33 of the light source unit 30 and is provided with throughholes 22 for allowing the terminal lead lines 34 to pass therethrough and to extend downward from the lower surface of the light-conducting plate 20.

As shown more clearly in FIG. 3, there are two light sources 35 arranged separate from each other near the bottom of the reflector case 31, each light source 35 supporting two LED chips 32G and 32B for emitting light of different colors so as to overlap in the direction of the height of the reflector case 31, or the thickness of the light-conducting plate 20. According to a preferred embodiment of this invention, one of the LED chips (32G) is for emitting yellowish green light in the wavelength range of 560–580 nm and the other LED chip (32B) is for emitting blue light in the wavelength range of 450–490 nm.

The two LED chips 32G of the two light sources 35 adapted to emit yellowish green light are electrically connected to each other in series. Likewise, the two LED chips 32B of the two light sources 35 adapted to emit blue light are electrically connected to each other in series such that the LED chips of each color can be independently switched on. To be explained more in detail with reference to FIG. 5, the bottom portion of the reflector case 31 supports a first upper terminal plate 41a, a second upper terminal plate 41b and a third upper terminal plate 41c which are thin and elongated plates extending in the longitudinal direction of the reflector case 31, as well as a first lower terminal plate 43a, a second lower terminal plate 43b and a third lower terminal plate 43c which are also thin and elongated plates extending parallel to and next to the respective upper terminal plates 41a, 41b and 41c. One of the LED chips 32G for emitting yellowish green light is bonded to one end part of the first upper terminal plate 41a and is connected by wire bonding to one of the end parts of the second upper terminal plate 41b. The other of the LED chips 32G for emitting yellowish green light is bonded to the other end part of the second upper terminal plate 41b and is connected by wire bonding to one end part of the third upper terminal plate 41c. Similarly, one of the LED chips 32B for emitting blue light is bonded to one end part of the first lower terminal plate 43a and is connected by wire bonding to one of the end parts of the second lower terminal plate 43b. The other of the LED chips 32B for emitting blue light is bonded to the other end part of the second lower terminal plate 43b and is connected by wire bonding to one of the end parts of the third lower terminal plate 43c. The other end parts of the first upper and lower terminal parts 41a and 43a and the third upper and lower terminal parts 41c and 43c extend as the terminal lead lines 34. In summary, the three upper terminal plates 41a, 41b and 41c and the three lower terminal plates 43a, 43b and 43c are mutually separated, allowing the LED chips 32G for emitting yellowing green light and the LED chips 32B for emitting blue light to be controlled independently of each other.

The light source unit 30, as described above, may be produced as follows. A lead frame is first prepared with each of the upper and lower terminal plates 41a, 41b, 41c, 43a, 43b and 43c as described above. The reflector case 31 shaped as described above is then formed by a resin molding method. The LED chips 32G and 32B are then connected to the terminal plates 41a, 41b, 41c, 43a, 43b and 43c by bonding and wire bonding, as described above. Unwanted portions of the lead frame are removed to obtain a light source unit 30 as shown in FIGS. 4 and 5. The void portion of the indentation 21 may be filled with a transparent resin material 36 as shown in FIG. 4 to protect the LED chips 32 and the wire-bonded parts.

Light source units 30, thus produced, are inserted into the light-conducting plate 20, as shown in FIGS. 1 and 2, such that each of the two light sources 35 has a yellowish green light-emitting LED chip 32G overlapping a blue light-emitting LED chip 32B in the direction of the height of the reflector case 31, or the thickness of the light-conducting plate 20. Thus, a viewer, who looks at the light-conducting plate 20 in the direction perpendicular to its surface, sees both blue light and yellowish green light superposed to each other even in areas which are close to either of the light sources 35. In other words, such a viewer will see a mixed color of yellowish green and blue uniformly over the entire surface of the light-conducting plate 20.

Since yellowish green may be regarded as a mixture of blue and red, as explained above, a nearly white color can be produced by properly mixing light from the two kinds of LED chips 32G and 32B. Since the LED chips 32G and 32B of different colors can be independently controlled according to this embodiment of the invention, furthermore, the color of illumination can be varied freely.

FIG. 6 shows another light source unit 130 according to a second embodiment of this invention which is different from the unit 30 described above with reference to FIGS. 1–5 in that the second upper and lower terminal plates 41b and 43b of the unit 30 are combined as a common terminal plate 141b. All four LED chips 32G and 32B are now bonded to this common terminal A plate 141b at its end parts and are connected by wire bonding to the first upper and lower terminal plates 41a and 43a and the third upper and lower terminal plates 41c and 43c. According to this embodiment, too, a yellowish green light-emitting LED chip 32G overlaps a blue light-emitting LED chip 32B at each of the light sources 35 in the direction of the height of the reflector case 31, or the thickness of the light-conducting plate 20.

The light source unit 130 as shown in FIG. 6 is advantageous in that each LED chip can be operated at a lower voltage because the LED chips emitting light of the same color are electrically connected in parallel. Thus, the power source for a portable electronic device into which an illuminator of this kind is incorporated can be made compact, and this means that the electronic device itself can be made smaller.

In each of the embodiments described above, the colors of light emitted from the LED chips may be varied in different ways. If a red light-emitting chip and a green light-emitting chip are placed near each other and independently controlled, light in all colors in the spectrum between red and green can be emitted.

FIGS. 7 and 8 show still another light source unit 230 according to a third embodiment of this invention which is like the units 30 and 130 according to the first and second embodiments of the invention described above in that two LED chips 32G and 32B for different colors of light are disposed at each of the light sources 35 so as to overlap with each other in the direction of the height of the reflector case 31, but is different in that the two LED chips 32G and 32B of different colors at each light source 35 are connected in common and cannot be controlled independently. Explained more in detail, there are inside the reflector case 31 a single first terminal plate 241a, a single second terminal plate 241b and a single third terminal plate 241c connected in series, a pair of LED chips 32G and 32B for emitting different colors of light being bonded to an end part of the first terminal plate 241a one above the other, an electrode on the upper surface of each of these LED chips 32G and 32B being connected by wire bonding to one end part of the second terminal plate 241b, another pair of LED chips 32G and 32B is similarly bonded to the other end part of the second terminal plate 241b one above the other, and an electrode on the upper surface of each of these LED chips 32G and 32B being connected by wire bonding to one end part of the third terminal plate 241c. The other end parts of the first and third terminal plates 241a and 241c are extended, serving as the terminal lead lines 34.

With a light source unit thus formed, the color of illumination of the light-conducting plate 20 cannot be freely varied but nearly white light of illumination can be emitted by selecting a suitable combination of LED chips.

FIG. 9 shows still another light source unit 330 according to a fourth embodiment of this invention similar to the first embodiment explained above with reference to FIGS. 1–5 but different therefrom wherein three LED chips 32G, 32B and 32R adapted to emit three different colors of light are used at each of the two light sources 35 which are separated from each other in the direction of elongation of the reflector case 31. Correspondingly, first, second and third upper terminal plates 341a, 341b and 341c which are connected in series together for controlling the LED chips 32G for emitting light of one of the three colors, first, second and third middle terminal plates 342a, 342b and 342c which are connected in series together for controlling the LED chips 32B for emitting light of another of the three colors, and first, second and third terminal plates 343a, 343b and 343c which are connected in series together for controlling the LED chips 32R for emitting light of the third color are provided parallel to one another such that the LED chips 32G, 32B and 32R having different colors can be controlled independently.

Explained more in detail with reference to FIG. 9, a group of three LED chips 32G, 32B and 32R is bonded vertically one above another respectively to an end part the first upper, middle and lower terminal plates 341a, 342a and 343a, and connected by wire bonding respectively to one end part of the second upper, middle and lower terminal plates 341b, 342b and 343b. Similarly, another group of three LED chips 32G, 32B and 32R is bonded vertically one above another respectively to the other end part of the second upper, middle and lower terminal plates 341b, 342b and 343b and connected by wire bonding respectively to one end part of the third upper, middle and lower terminal plates 341c, 342c and 343c. The other ends parts of the first and third upper, middle and lower terminal plates 341a, 342a, 343a, 341c, 342c and 343c are extended to form the terminal lead lines 34. For example, the colors of light emitted from the three kinds of LED chips 32G, 32B and 32R may be yellowish green, blue and red such that light of all different colors, including white, can be generated by mixing light from these three kinds of LED chips 32G, 32B and 32R.

The invention has been described above by way of only a limited number of embodiments, but these embodiments are not intended to limit the scope of the invention. Many modifications and variations are possible within the scope of the invention. For example, the reflector case 31 in each of the embodiments described above may be dispensed with by bonding a plurality of LED chips for emitting light of different colors onto a terminal plate so as to be vertically arranged and inserting this assembly directly into the transparent or translucent resin material forming the light-conducting plate. As another example, the connections of the LED chips to the terminal plates need not be effected by the traditional method of bonding or wire bonding. FIG. 10 shows another example wherein cubically shaped LED chips 32 with surface electrodes are each soldered to a pair of mutually adjacent terminal plates 46 separated by a gap 44. In summary, all such amendments and variations that may be apparent to a person skilled in the art are intended to be within the scope of this invention.

What is claimed is:

1. An illuminator with a light-emitting surface, comprising:
 a light-conducting plate having an edge part and a main surface, an indentation being formed on said main surface at said edge part; and
 a light-emitting part comprising a plural number of mutually adjacently disposed LED chips each emitting light of a different color and a reflector which supports said LED chips and is disposed inside said indentation.

2. The illuminator of claim 1 wherein said LED chips are connected such that those of said LED chips emitting a same one of said different colors are controlled together and those of said LED chips emitting different ones of said colors are independently controlled.

3. The illuminator of claim 2 wherein said plural number is three and said different colors are red, green and blue.

4. The illuminator of claim 2 wherein said plural number is two and said different colors are yellowish green and blue.

5. The illuminator of claim 1 wherein said plural number is three and said different colors are red, green and blue.

6. The illuminator of claim 1 wherein said plural number is two and said different colors are yellowish green and blue.

7. An illuminator with a light-emitting surface, comprising:
 a light-conducting plate having an edge part and defining a direction of thickness; and
 light sources at said edge part of said light-conducting plate, said light sources each comprising a plural number of mutually adjacently disposed LED chips each emitting light of a different color, said plural number of LED chips of each of said light sources being aligned in said direction of thickness.

8. The illuminator of claim 7 wherein said LED chips are connected such that those of said LED chips emitting a same one of said different colors are controlled together and those of said LED chips emitting different ones of said colors are independently controlled.

9. The illuminator of claim 8 wherein said plural number is three and said different colors are red, green and blue.

10. The illuminator of claim 8 wherein said plural number is two and said different colors are yellowish green and blue.

11. The illuminator of claim 7 wherein said plural number is three and said different colors are red, green and blue.

12. The illuminator of claim 7 wherein said plural number is two and said different colors are yellowish green and blue.

* * * * *